Feb. 2, 1965   D. F. BILLHARDT   3,168,090
SELF-CONTAINED WELDING TORCH
Filed May 2, 1960
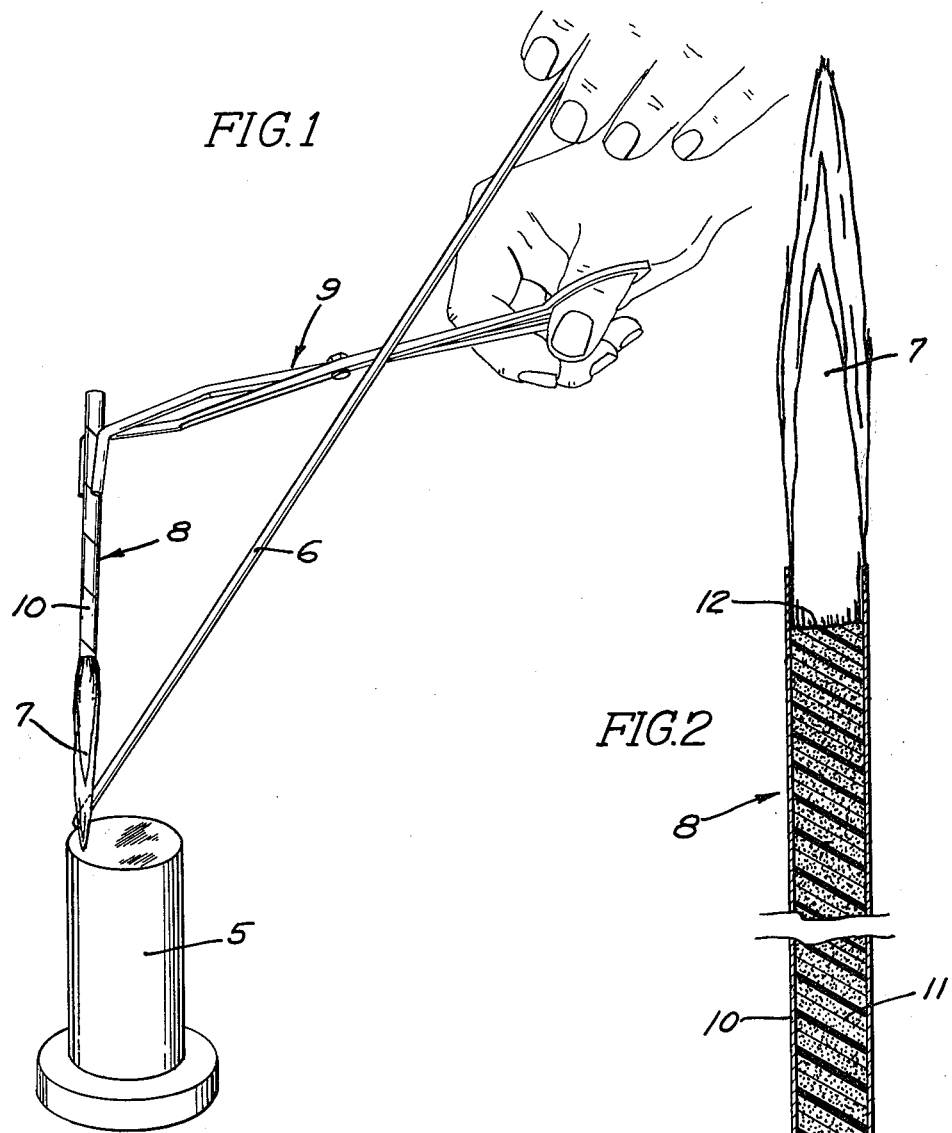
INVENTOR.
DONALD F. BILLHARDT
BY Herbert E. Kidder,
AGENT

United States Patent Office 3,168,090
Patented Feb. 2, 1965

3,168,090
SELF-CONTAINED WELDING TORCH
Donald F. Billhardt, Redlands, Calif., assignor, by mesne assignments, to Lockheed Aircraft Corporation, Burbank, Calif., a corporation of California
Filed May 2, 1960, Ser. No. 26,072
4 Claims. (Cl. 126—263)

The present invention relates to gas-producing pyrotechnic torches for welding, brazing and cutting of various metals, and the primary object of the invention is to provide an inexpensive, self-contained welding torch which can be used for routine maintenance work, or for making low cost emergency repairs to machines, pipe lines, water tanks, and the like in the field, where conventional welding equipment may not be available.

Another object of the invention is to provide a self-contained welding torch which burns at temperatures up to 6000° F. for a period of several minutes, and therefore is capable of laying a substantial length of welding bead, or of cutting through heavy steel plate.

A further object of the invention is to provide a self-contained welding torch which is compact, light in weight, safe to handle and ignite, and of low toxicity.

Still another object of the invention is to provide a welding torch which is economical to use, and in which there is little or no wasted or unused fuel.

These and other objects and advantages of the present invention will become apparent to those skilled in the art upon consideration of the following detailed description of the preferred embodiment thereof, reference being had to the accompanying drawings, wherein:

FIGURE 1 is a perspective view, showing the invention in use; and

FIGURE 2 is an enlarged cross-sectional view taken through the welding torch, showing the manner in which combustion takes place.

In the drawings, the reference numeral 5 designnates a workpiece which is being welded. A conventional welding rod 6 may be held with one end thereof adjacent the area to be welded, as shown in FIGURE 1, and the flame 7 of a welding torch 8 is played on the end of the welding rod 6 and workpiece 5. The welding torch 8 may be held in the hand, or where its length is rather short, it may be held by a pair of tongs 9, as in the drawing.

As best shown in FIGURE 2, the welding torch 8 comprises a spirally wound tube 10 of paper or plastic, which is loaded with high energy, gas producing pyrotechnic material 11 of the type used as solid propellant in rocket motors. The pyrotechnic material 11 is not restricted to any particular type, since both composite and double base type propellants have been used with success. It is essential that the pyrotechnic material 11 burn with a combustion temperature of from 3500° F. to 6000° F. in order to weld, braze or cut various metals, and it is also desirable that it burn with little or no smoke, and with a minimum of toxic fumes. This eliminates many of the pyrotechnic materials used in flares and the like, as the temperatures achieved by such materials are not sufficiently high for welding, brazing and cutting. Other pyrotechnic materials produce excessive smoke or toxic fumes.

While there are many pyrotechnic materials that can be used for the purpose, the following three compositions are representative of the type of pyrotechnic material contemplated within the scope of the present invention:

*Example 1*

Approximately 3 parts by weight of ammonium perchlorate is mixed with approximately 1 part of butyl formal polysulfide liquid polymer, and a relatively small percentage of p-quinone dioxime and sulfur are added to the mixture. The material is then cast into tubes 10, and is polymerized by heat to form a tough, semi-hard, rubbery material having a combustion temperature high enough for welding and brazing.

*Example 2*

Approximately 5 parts by weight of ammonium perchlorate is mixed with 1 part of carboxylated butadiene acrylonitrile liquid polymer, and a small percentage of epoxide resin. The material is then cast into tubes 10, and is polymerized to form a tough, semi-hard, rubbery material having a combustion temperature somewhat higher than that of Example 1.

*Example 3*

Ammonium perchlorate, nitrocellulose (pyrograde miscrospheres) pentaerythritol trinitrate, triethylene glycol dinitrate, symmetrical diethyl diphenyl urea, and resorcinol may be mixed together in varying proportions, with the ammonium perchlorate constituting about 35% by weight of the total. This mixture is cast into tubes 10, and is then polymerized to provide a pyrotechnic material having an extremely high combustion temperature with an excess of oxygen, making it well suited for cutting and high temperature welding.

In addition to the foregoing examples, there are other well known high energy rocket propellant materials based on natural and synthetic polymers mixed with ammonium perchlorate or other oxidizers, which can be loaded into the tube 10 or provide a pyrotechnic material having a high combustion temperature. Further, it is contemplated that the pyrotechnic material 11 might have a quantity of finely divided iron oxide and aluminum powder mixed therewith, which reacts in an exothermic reaction to produce pure molten iron. This would eliminate the need for a welding rod. Alternatively, the iron oxide and aluminum powder might be applied to the inside of the tube 10 before the pyrotechnic material 11 is cast therein. The ingredients of the pyrotechnic material 11 and the relative proportions thereof may be varied over a wide range to produce the proper flame conditions required for a specific type of operation, depending upon the nature of the material, the temperature required, and whether or not an excess of oxygen is required, as for cutting.

The tube 10 may be of any suitable material, such as paper or plastic, and one material which has been particularly successful is cellulose acetate butyrate, to which suitable fillers may be added to vary its rigidity or to inhibit the rate of burning. The tube 10 may also be made of cellophane with a nitrocellulose coating or polyvinylidene chloride (commonly known as Saran). Cellulose acetate butyrate may be used without filler if the wall thickness is adjusted. While this material works well with the three examples of propellants given, it works especially well with Examples 2 and 3. Cellophane with nitrocellulose coating also works well with the propellants given in Examples 2 and 3. Polyvinylidene chloride when associated with the propellant of Example 1 provides an excellent burning rate as described. The tube 10 may be of any dimensions, but is preferably in the range of one-quarter inch to one inch in diameter, and about twenty inches long.

The torch 8 can be ignited with a match and as the pyrotechnic material 11 burns, the burning surface 12 recedes. The paper or plastic tube 10 also burns and recedes, but lags somewhat behind the burning surface 12. This leaves a short length of unburned tube in the form of a nozzle projecting beyond the burning surface 12 which directs and, to a certain degree, forms the flame 7 into a pencil-thin jet. To shut off the torch, it is necessary only to snip off the burning tip just ahead of the burning surface 12, with a pair of scissors.

Owing to the fact that the pyrotechnic material 11 contains both fuel and oxidizing agent, it does not require the oxygen of air to support combustion, and is therefore capable of burning under water as well as in the air. The welding torch of the present invention can therefore be used for making underwater welding repairs of the type which normally requires expensive specialized equipment.

While I have shown and described what I believe to be the preferred form of my invention, it will be understood by those skilled in the art that various changes may be made without departing from the broad scope of the invention, as defined in the appended claims.

I claim:

1. A self-contained welding torch consisting of a thin-walled tube of combustible plastic material loaded with a high energy, gas producing pyrotechnic material of the type used as solid rocket propellant, said tube material burning at a slower rate than said pyrotechnic material, whereby a short length of unburned tube projects beyond the burning surface to form a nozzle that directs and forms the flame into a pencil-thin jet.

2. A self-contained welding torch as defined in claim 1, wherein said pyrotechnic material includes an excess of oxidizer, so that an excess of free oxygen is released in the flame for cutting purposes.

3. A self-contained welding torch as defined in claim 1, wherein said torch includes a quantity of finely divided metallic oxide and a reducing agent operable to reduce said metallic oxide to the pure metal state.

4. A self-contained welding torch as defined in claim 1, wherein said torch includes a mixture of finely divided iron oxide and aluminum powder, whereby said aluminum powder reacts exothermically with said iron oxide to reduce the same to pure molten iron.

References Cited in the file of this patent

UNITED STATES PATENTS

| | | |
|---|---|---|
| 2,253,364 | Cohen | Aug. 19, 1941 |
| 2,289,318 | Pratt | July 7, 1942 |
| 2,387,715 | Cadwell | Oct. 30, 1945 |
| 2,543,533 | Olin | Feb. 27, 1951 |
| 2,569,956 | Schiltknecht | Oct. 2, 1951 |
| 2,619,083 | Bowersett | Nov. 25, 1952 |
| 2,740,702 | Mace | Apr. 3, 1956 |
| 2,836,172 | Ginsburgh et al. | May 27, 1958 |
| 2,931,437 | Smith | Apr. 5, 1960 |
| 2,988,435 | Stanley | June 13, 1961 |

FOREIGN PATENTS

| | | |
|---|---|---|
| 139,856 | Great Britain | Mar. 18, 1920 |
| 410,723 | France | Mar. 21, 1910 |
| 742,283 | Great Britain | Dec. 21, 1955 |